United States Patent [19]
Ward et al.

[11] Patent Number: 5,382,862
[45] Date of Patent: Jan. 17, 1995

[54] ALTERNATING CURRENT GENERATOR ROTOR

[75] Inventors: Robert W. Ward; Sam B. Parker; William E. Boys, all of Anderson, Ind.

[73] Assignee: General Motors Corporation, Detroit, Mich.

[21] Appl. No.: 157,452

[22] Filed: Nov. 22, 1993

Related U.S. Application Data

[63] Continuation of Ser. No. 915,584, Jul. 20, 1992, abandoned.

[51] Int. Cl.⁶ .................. H02K 15/03; H01F 1/22; H01F 27/24
[52] U.S. Cl. .................. 310/263; 310/42; 310/44; 310/156; 148/121; 252/62.54; 29/598
[58] Field of Search .................. 310/42–45, 310/49 A, 156, 216, 218, 265; 148/104, 121, 122; 252/62, 54; 29/598

[56] References Cited

U.S. PATENT DOCUMENTS

| | | | |
|---|---|---|---|
| 3,305,740 | 2/1967 | Shano | 310/42 |
| 4,071,788 | 1/1978 | Martin et al. | 310/42 |
| 4,105,907 | 8/1978 | Hagenlocher et al. | 310/232 |
| 4,114,056 | 9/1978 | Niwura | 310/42 |
| 4,543,208 | 9/1985 | Horie et al. | 252/62.54 |
| 4,588,915 | 5/1986 | Gold et al. | 310/194 |
| 4,601,765 | 7/1986 | Soileau et al. | 148/104 |
| 4,947,065 | 8/1990 | Ward et al. | 310/44 |
| 4,961,016 | 10/1990 | Peng et al. | 310/62 |
| 5,004,577 | 4/1991 | Ward | 264/112 |
| 5,016,340 | 5/1991 | Kato | 29/598 |
| 5,063,011 | 11/1991 | Rutz et al. | 264/126 |
| 5,121,021 | 6/1992 | Ward | 310/154 |

Primary Examiner—Kristine L. Peckman
Assistant Examiner—D. R. Haszko
Attorney, Agent, or Firm—Vincent A. Cichosz

[57] ABSTRACT

A rotor for an alternating current generator of the Lundell type. The rotor shaft carries two segments which have interleaved pole teeth. The rotor has a core member and a field coil disposed about the core member. The segments and/or core member are formed of compressed powder iron particles having a particle size in a range of about 10 to 250 microns. In the manufacture of the core and/or segments the iron powder particles are coated with a thermoplastic material and this thermoplastic coated iron particle material is compacted in the molding dies of a press. After compaction to the desired shape, the part is sintered at a temperature of about 2050° F. to burn-off the thermoplastic material that coated the iron particles.

4 Claims, 1 Drawing Sheet

ALTERNATING CURRENT GENERATOR ROTOR

This is a continuation of application Ser. No. 07/915,584 filed on Jul. 20, 1992, now abandoned.

This invention relates to an alternating current generator rotor of the Lundell type that has a pair of rotor segments provided with interleaved pole teeth or fingers and a rotor core that carries a field coil.

Alternating current generators of the Lundell type are well known to those skilled in the art, one example being the rotor disclosed in the U.S. Pat. No. to Gold et al., 4,588,915. The pole segments and rotor core that are parts of the rotor are formed of steel. Thus, the segments are formed from sheet steel material and the core is formed as a headed steel part.

This invention differs from the rotor shown in the above-referenced Gold et al. patent in that, among other things, certain or all of the metallic magnetic components of the rotor are formed of compressed iron particles. More specifically, the magnetic components of the rotor are formed by a method or process where iron particles having a particle size in a range of about 10 to 250 microns are coated with a thermoplastic material. The coated particles are then compacted or pressed to shape at a pressure of about 40 to 50 tons per square inch in a heated mold die of a press. The thermoplastic material acts as a lubricant during the compacting or pressing operation. When a magnetic component or part of the rotor has been pressed to shape, as described, the part is then sintered at a temperature of about the 2050° F. During this sintering operation, the tacky thermoplastic material that coats the particles and binds them together is burned or driven-off due to the high temperature of the sintering operation. During sintering, the thermoplastic coating material is burned-off, and in addition, the iron particles now become fused together.

It accordingly is an object of this invention to provide an alternating current generator of the Lundell type where the segments and/or core of the generator are formed of coated iron particles that have been pressed to shape and sintered in a manner that has been described.

BRIEF DESCRIPTION OF THE DRAWINGS

Referring now to the drawings, FIG. 1 illustrates a rotor for an alternating current generator. This rotor has two poles or segments designated respectively as 10 and 12. The segments 10 and 12 are identical and the segment 10 is shown in the perspective view of FIG. 2. As illustrated in FIG. 2, segment 10 has six circumferentially spaced pole teeth or fingers each designated as 14. The pole teeth 14 are separated by notches 16. The segment 10 has a cylindrical core portion 18 that extends axially from an end wall portion 20. The segment 10 has a central cylindrical bore or hole 22.

Referring to FIG. 1, the segment 10 is secured to a shaft 24 of the rotor. This is accomplished by a knurled portion 26.

Figures 1, 2, 3:
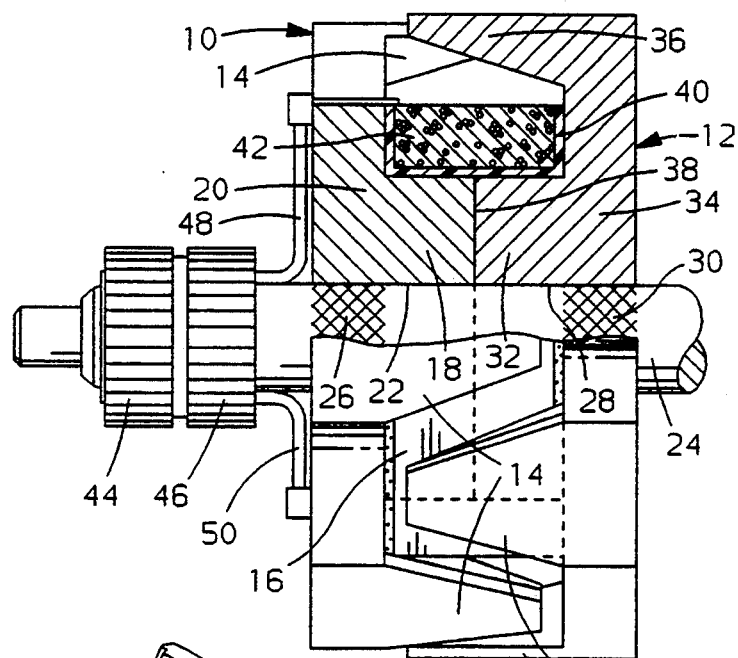
FIG. 1 is a side view with parts broken away of a rotor for an alternating current generator made in accordance with this invention.
FIG. 2 is a perspective view of one of the rotor segments of the rotor shown in FIG. 1.
FIG. 3 is a side view, with parts broken, of a modified rotor for an alternating current generator made in accordance with this invention.

The segment 12 has a central cylindrical bore 28 disposed about shaft 24 and secured to shaft 24 by knurled portion 30. Segment 12 has a cylindrical core portion 32 that extends axially from end wall portion 34. The segment 12 further has six circumferentially spaced pole teeth or fingers 36 that are separated by notches. The pole teeth 14 are interleaved with the pole teeth 36; that is, the pole teeth of one of the segments are disposed between the pole teeth of the other segment in a known manner.

The inner end face of cylindrical portions 18 and 32 abut or engage each other along 38. The cylindrical core portions 18 and 32 form a rotor core. A field coil assembly is disposed about this rotor core. This field coil assembly comprises a spool 40 that is formed of electrical insulating material that carries a field coil 42 that is formed of a number of turns of wire. The opposite ends of field coil 42 are connected to metallic slip rings 44 and 46 by conductors 48 and 50. The slip rings 44 and 46 are carried by rotor shaft 24 and are electrically insulated from the shaft and each other in a manner known to those skilled in the art.

Referring now to FIG. 3, a modified alternating current generator rotor is illustrated. The rotor of FIG. 3 has two segments 54 and 56 and a core 58 that is separate from segments 54 and 56. Segments 54 and 56 are secured to rotor shaft 60 as is rotor core 58. Core 58 has a central bore or opening 62 for receiving rotor shaft 60.

The segment 54 has a plurality of circumferentially spaced pole teeth each designated as 64 that are interleaved with the circumferentially spaced pole teeth 66 of segment 56. The opposite end faces of core 58 engage or abut inside surfaces of segments 54 and 56.

The rotor of FIG. 3 has a field coil assembly comprised of a spool 68 that is formed of electrical insulating material. Spool 68 carries a field coil 70 that is comprised of a number of turns of wire.

The opposite ends of field coil 70 are connected respectively to metallic slip rings 72 and 74 by conductors 76 and 78.

The magnetic material that is utilized for segments 10 and 12 and their method of manufacture will now be described.

The segments 10 and 12 are formed of small size iron powder particles. By way of example and not by way of limitation, the iron powder particles may be a Hoganaes 1000-C iron powder. The particle sizes of the iron particles may range from about 44 to 250 microns. However, a very small percentage of the powder may have a particle size as small as 10 microns. The powder is about 99.7% Fe, 0.003% C, 0.0005% N, 0.006% S and 0.004% P.

In the method of manufacture of segments 10 and 12, the iron powder particles are coated with a thermoplastic material which may be, for example, a polyphenylene oxide supplied by General Electric under the trade name Noryl. One way of accomplishing this is to mix the thermoplastic material with a solvent to provide a liquid material. The iron powder is then blown by air through a vertical tube and at the same time, the liquid material is sprayed on the powder to coat the powder particles. The coated powder falls outside of the tube and it is directed back into an inlet of the tube where it is blown up again and coated again. After a number of passes through the tube, the particles are all coated to the extent desired. The solvent evaporates or is recovered during this process.

After the iron particles have been coated, as described, a quantity of the coated iron powder is fed into a die or mold of a press. The shape of the die or mold is configured to provide the shape of segments 10 and 12. The proportion of iron powder and thermoplastic material that are used may be, by weight, about 99.0% to 99.9% iron powder and 0.1% to 1.0% thermoplastic. During this feeding operation, the coated iron powder is heated to about 330° to 380° F. Further, the die or mold is heated to about 550° to 600° F. With the material in the mold or die, it is compressed at a pressure of about 40 to 50 tons per square inch for about 6 to 12 seconds. The thermoplastic material takes on a tacky state during this operation.

During the compression molding, the thermoplastic material operates as a lubricant which increases the density of the molded or pressed segment. The density will exceed 7.4 grams per cubic centimeter and is substantially constant throughout the critical strength areas of the segment.

After the segment has been compression molded as has been described, the compressed segment is sintered at a temperature of about 2050° F. for about 15 to 45 minutes. The thermoplastic material that coats or encapsulates the iron powder particles is burned-off during the sintering operation due to the high temperature of the sintering operation. Thus, the iron powder particles no longer have a thermoplastic coating since the thermoplastic coating has been burned or driven off. Further, during sintering, the iron particles have a tendency to fuse together.

In the rotor shown in FIG. 3, the core 58 is formed of the same material as segments 10 and 12 and the core 58 is formed by the same process as has been described in connection with the process for making the segments 10 and 12. In FIG. 3, the segments 54 and 56 are formed of conventional steel magnetic material. Thus, segments 54 and 56 are not formed of powdered iron particles.

In regard to the rotor shown in FIG. 3, it will be appreciated that segments 54 and 56 and rotor core 58 could all be formed of powdered iron; that is, of the same material that has been described for segments 10 and 12. Further, segments 54 and 56 can be made by the same process as has been described in connection with the process of manufacturing segments 10 and 12.

In regard to the FIG. 3 rotor, the segments 54 and 56 can be formed of powdered iron with the core 58 being formed of steel.

One of the advantages of this invention is that by using compressed iron powder particles to form the segments of the rotor, the pole teeth of the rotor, such as pole teeth 14, can be formed into intricate shapes simply by compression molding. Moreover, the cylindrical integral core parts 18 can be formed by compression molding. Further, this invention eliminates the need for heavy piercing and forming equipment that are associated with manufacturing rotor parts for Lundell type of rotors from rather heavy gauge sheet steel.

It can be appreciated that the field coils 42 and 70 form a flux generating means for the rotor in a manner well known to those skilled in the art when they are energized by direct current. Further, the core parts 18 and 32 (FIG. 1) and the core 58 (FIG. 3) form a magnetic circuit for carrying flux developed by field coils 42 and 70.

The embodiments of the invention in which an exclusive property or privilege is claimed are defined as follows:

1. A rotor for an alternating current generator comprising, a shaft, first and second segments carried by said shaft each formed of magnetic material, said first segment having a plurality of circumferentially spaced and axially extending first pole teeth, said second segment having a plurality of circumferentially spaced and axially extending second pole teeth, said first and second pole teeth being interleaved, and a core disposed between said segments having opposed end surfaces that respectively engage said first and second segments, said core being formed of compacted iron powder particles that have a particle size in a range of about 10 to 250 microns, said core being formed by compacting iron powder particles that have been coated with a thermoplastic material and then heating the compacted core at a temperature that is high enough to burn-off substantially all the thermoplastic material thereby allowing the compacted iron powder particles to sinter.

2. A rotor for an alternating current generator comprising, a shaft, first and second segments carried by said shaft, said first segment having a plurality of circumferentially spaced and axially extending first pole teeth, said first segment having a first cylindrical axially extending core portion, said second segment having a plurality of circumferentially spaced and axially extending second pole teeth, said second segment having a second cylindrical axially extending core portion, said first and second pole teeth being interleaved, said first and second cylindrical axially extending core portions respectively having end surfaces that are engaged to thereby form a core, said first and second segments being formed of compacted iron powder particles that have a particle size in a range of about 10 to 250 microns, said segments being formed by compacting iron powder particles that have been coated with a thermoplastic material and then heating the compacted segments at a temperature that is high enough to burn-off substantially all the thermoplastic material thereby allowing the compacted iron powder particles to siner.

3. A rotor for an alternating current generator comprising, a shaft, first and second segments carried by said shaft formed of magnetic material, said first segment having a plurality of circumferentially spaced and axially extending first pole teeth, said second segment having a plurality of circumferentially spaced and axially extending second pole teeth, said first and second pole teeth being interleaved, and a core disposed between said segments having opposed end surfaces that respectively engage said first and second segments, said core being formed of magnetic material, at least one of said first and second segments being formed of compacted iron powder particles that have a particle size in a range of about 10 to 250 microns, said at least one segment being formed by compacting iron powder particles that have been coated with a thermoplastic material and then heating the compacted segment at a temperature that is high enough to burn-off substantially a the thermoplastic material thereby allowing the compacted iron powder particles to sinter.

4. A rotor for an alternating current generator comprising, a shaft, first and second segments carried by said shaft formed of magnetic material, said first segment having a plurality of circumferentially spaced and axially extending first pole teeth, said second segment having a plurality of circumferentially spaced and axially extending second pole teeth, said first and second pole teeth being interleaved, and a core disposed between said segments having opposed end surfaces that respectively engage said first and second segments, said core being formed of magnetic material, said first and second segments being formed of compacted iron powder particles that have a particle size in a range of about 10 to 250 microns, said first and second segments being formed by compacting iron powder particles that have been coated with a thermoplastic material and then heating the compacted core at a temperature that is high enough to burn-off substantially all the thermoplastic material thereby allowing the compacted iron powder. particles to sinter.

* * * * *